(12) United States Patent
Longman et al.

(10) Patent No.: US 8,469,808 B2
(45) Date of Patent: Jun. 25, 2013

(54) SYSTEM AND METHOD FOR MANAGING A GAME CONTROLLER DEVICE FOR ELECTRONIC TRADING

(75) Inventors: James A. Longman, London (GB); Joseph C. Noviello, New York, NY (US)

(73) Assignee: BGC Partners, Inc., New York, NY (US)

( * ) Notice: Subject to any disclaimer, the term of this patent is extended or adjusted under 35 U.S.C. 154(b) by 2289 days.

(21) Appl. No.: 11/171,809

(22) Filed: Jun. 29, 2005

(65) Prior Publication Data
US 2005/0239523 A1   Oct. 27, 2005

Related U.S. Application Data

(63) Continuation-in-part of application No. 10/759,693, filed on Jan. 15, 2004, now Pat. No. 7,207,885.

(51) Int. Cl.
| | |
|---|---|
| *A63F 9/24* | (2006.01) |
| *A63F 13/00* | (2006.01) |
| *G06F 17/00* | (2006.01) |
| *G06F 19/00* | (2011.01) |

(52) U.S. Cl.
USPC .......................................................... 463/36

(58) Field of Classification Search
USPC ..................................... 463/37; 345/156, 172
See application file for complete search history.

(56) References Cited

U.S. PATENT DOCUMENTS

| | | | |
|---|---|---|---|
| 5,243,331 A | 9/1993 | McCausland et al. ........ 345/172 |
| 5,315,364 A | 5/1994 | Arion et al. .................... 356/32 |
| 5,321,765 A | 6/1994 | Costello ......................... 382/125 |
| 5,461,217 A | 10/1995 | Claus ............................. 235/380 |
| 5,644,113 A | 7/1997 | Date et al. |
| 5,853,326 A | 12/1998 | Goto et al. ...................... 463/37 |
| 5,896,125 A * | 4/1999 | Niedzwiecki ................. 345/168 |
| 5,903,880 A | 5/1999 | Biffar |
| 6,071,194 A | 6/2000 | Sanderson et al. .............. 463/37 |
| 6,105,006 A | 8/2000 | Davis et al. |
| 6,213,880 B1 | 4/2001 | Sim ................................. 463/37 |
| 6,231,880 B1 | 5/2001 | Perrine |
| 6,251,012 B1 * | 6/2001 | Horigami et al. ................ 463/7 |

(Continued)

FOREIGN PATENT DOCUMENTS

| | | |
|---|---|---|
| EP | 0 394 614 A2 | 1/1990 |
| EP | 0 206 565 B1 | 4/1991 |

(Continued)

OTHER PUBLICATIONS

Smart Computing, http://www.smartcomputing.com/Editorial/article.asp?article=articles/archive/r0202/39t2/39t2.asp&guid.*

(Continued)

*Primary Examiner* — Pierre E. Elisca
*Assistant Examiner* — Reginald Renwick
(74) *Attorney, Agent, or Firm* — Thomas D. Bradshaw

(57) ABSTRACT

According to one embodiment, a method for electronic trading is provided. A plurality of controller signal relationships are stored, each controller signal relationship associating one or more game controller signals with a trading system command associated with the electronic trading of financial instruments via a trading platform. One or more game controller signals generated by a game controller are received and at least one of the plurality of controller signal relationships is modified based at least on the one or more received game controller signals.

37 Claims, 6 Drawing Sheets

U.S. PATENT DOCUMENTS

| | | | |
|---|---|---|---|
| 6,272,474 | B1 | 8/2001 | Garcia |
| 6,311,167 | B1 | 10/2001 | Davis et al. |
| 6,400,996 | B1 | 6/2002 | Hoffberg et al. ............... 700/83 |
| 6,422,941 | B1 | 7/2002 | Thorner et al. ............... 463/30 |
| 6,505,175 | B1 | 1/2003 | Silverman et al. ............ 705/37 |
| 6,538,636 | B1 | 3/2003 | Harrison .................... 345/156 |
| 6,585,599 | B1* | 7/2003 | Horigami et al. ............. 463/43 |
| 6,615,299 | B1 | 9/2003 | Chu et al. .................... 710/65 |
| 6,625,583 | B1 | 9/2003 | Silverman et al. ............ 705/36 |
| 6,727,890 | B2 | 4/2004 | Andres et al. ............... 345/168 |
| 6,938,011 | B1 | 8/2005 | Kemp, II et al. |
| 7,116,310 | B1 | 10/2006 | Evans et al. |
| 7,167,860 | B1 | 1/2007 | Black et al. |
| 7,207,885 | B2 | 4/2007 | Longman .................... 463/37 |
| 7,228,289 | B2 | 6/2007 | Brumfield et al. |
| 2001/0040562 | A1* | 11/2001 | Masudaya .................. 345/173 |
| 2001/0045938 | A1 | 11/2001 | Willner et al. |
| 2001/0053712 | A1 | 12/2001 | Yoseloff et al. ................ 463/1 |
| 2002/0007335 | A1 | 1/2002 | Millard et al. |
| 2002/0070915 | A1* | 6/2002 | Mazza et al. ................ 345/156 |
| 2002/0099634 | A1 | 7/2002 | Coutts et al. |
| 2002/0099895 | A1 | 7/2002 | Landron et al. ............. 710/303 |
| 2002/0113987 | A1 | 8/2002 | Kohli ......................... 358/1.13 |
| 2002/0163597 | A1 | 11/2002 | Kelleher et al. |
| 2002/0165794 | A1 | 11/2002 | Ishihara |
| 2002/0184500 | A1 | 12/2002 | Maritzen et al. |
| 2003/0009411 | A1 | 1/2003 | Ram et al. .................... 705/37 |
| 2003/0018569 | A1 | 1/2003 | Eisenthal et al. ............. 705/37 |
| 2003/0065609 | A1 | 4/2003 | Oh ................................ 705/37 |
| 2003/0103038 | A1 | 6/2003 | Wong et al. ................ 345/158 |
| 2003/0103127 | A1 | 6/2003 | Khormaei et al. |
| 2003/0126063 | A1 | 7/2003 | Reuter et al. |
| 2003/0158796 | A1 | 8/2003 | Balent ........................... 705/28 |
| 2003/0187771 | A1 | 10/2003 | Bulan |
| 2003/0187795 | A1 | 10/2003 | Lee et al. ...................... 705/44 |
| 2003/0216173 | A1 | 11/2003 | Gauselmann |
| 2004/0068458 | A1 | 4/2004 | Russo |
| 2004/0078287 | A1 | 4/2004 | Yang |
| 2004/0103054 | A1 | 5/2004 | Singer |
| 2004/0103127 | A1 | 5/2004 | Bjornson et al. ............ 708/160 |
| 2004/0117292 | A1 | 6/2004 | Brumfield et al. ............ 705/37 |
| 2004/0153394 | A1 | 8/2004 | West et al. |
| 2004/0167847 | A1 | 8/2004 | Nathan |
| 2004/0209596 | A1 | 10/2004 | Wong et al. ................. 455/405 |
| 2004/0210504 | A1 | 10/2004 | Rutman |
| 2004/0249699 | A1 | 12/2004 | Laurent et al. |
| 2005/0027642 | A1 | 2/2005 | Howorka et al. |
| 2005/0060255 | A1 | 3/2005 | Heaton |
| 2005/0125328 | A1 | 6/2005 | Schluetter |
| 2005/0137955 | A1 | 6/2005 | Downie et al. |
| 2005/0144113 | A1 | 6/2005 | Opperman et al. |
| 2005/0239524 | A1 | 10/2005 | Longman et al. ............... 463/9 |
| 2006/0253384 | A1 | 11/2006 | Rutt et al. |
| 2006/0259417 | A1 | 11/2006 | Marynowski et al. |
| 2006/0265321 | A1 | 11/2006 | Brumfield et al. |
| 2007/0038549 | A1 | 2/2007 | Janowski et al. |
| 2007/0118452 | A1 | 5/2007 | Mather et al. |
| 2007/0150401 | A1 | 6/2007 | Brucato et al. |
| 2007/0188452 | A1 | 8/2007 | Chen et al. |
| 2007/0208647 | A1 | 9/2007 | Gemuenden et al. |
| 2008/0228618 | A1 | 9/2008 | Noviello |

FOREIGN PATENT DOCUMENTS

| | | |
|---|---|---|
| EP | 0 813 175 A2 | 12/1997 |
| EP | 0434224 B1 | 7/1999 |
| EP | 0 813 175 A3 | 3/2000 |
| EP | 0813175 A3 | 3/2000 |
| EP | 1555603 A2 | 7/2005 |
| GB | 2 392 763 | 3/2004 |
| GB | 2392763 A | 3/2004 |
| JP | 6-149460 | 5/1994 |
| JP | 11-288352 | 10/1999 |
| JP | 2002287876 A | 3/2001 |
| JP | 2001-195475 | 7/2001 |
| JP | 2001-312359 | 11/2001 |
| JP | 2002-215298 | 7/2002 |
| JP | 2002 287876 | 10/2002 |
| JP | 2002-342021 | 11/2002 |
| JP | 2003-24634 | 1/2003 |
| JP | 2003-117237 | 4/2003 |
| JP | 2004/30160 | 1/2004 |
| JP | 2004/38953 | 2/2004 |
| JP | 2004-272374 | 9/2004 |
| JP | 2005-63409 | 3/2005 |
| WO | WO 95/16971 | 6/1995 |
| WO | WO 95/06918 | 9/1995 |
| WO | WO 00/61252 | 10/2000 |
| WO | WO 00/61252 A1 | 10/2000 |
| WO | WO 01/25989 A1 | 4/2001 |
| WO | WO 01/26003 A1 | 4/2001 |
| WO | WO 01/71672 A1 | 9/2001 |
| WO | WO/02/098054 | 12/2002 |
| WO | WO 2004/036725 A2 | 4/2004 |
| WO | WO 2005/069819 A2 | 8/2005 |

OTHER PUBLICATIONS

Turn off Stick Keys, http://www.microsoft.com/windowsxp/using/setup/learnmore/tips/le1.mspx.*

Micorosoft Word 2003, Camarda, Bill, "Special edition using Microsoft Office Word 2003," Dec. 2003.*

Maximum Windows 2000 Security by Mark Burnett et al., Copyright 2002.*

Combined Search and Examination Report under Sections 17 and 18(3) for UK Patent Application No. GB0802593.4, UK Intellectual Property Office, Feb. 29, 2008 (9 pages).

Microsoft® Halo® User Guide, Bungie/Microsoft, pp. 6-7, available from http://downloads.planetmirror.com/pub/replacementdocs/Halo_-Manual_-_XBX.pdf (accessed May 22, 2007).

"The Ultimate XBOX Arcade Joystick," X-Arcade, available from http://web.archive.org/web/20031001102758/http://www.x-arcade.com/xbox.shtml (accessed Feb. 28, 2008).

Patent Pending U.S. Appl. No. 11/738,824 entitled *System and Method for Using a Game Controller Device for Electronic Trading* by James A. Longman, 29 total pages, filed Apr. 23, 2007.

Patent Pending U.S. Appl. No. 11/738,884 entitled *System and Method for Using a Game Controller Device for Electronic Trading* by James A. Longman, 28 total pages, filed Apr. 23, 2007.

*Microsoft® Halo® User Guide*, Bungie/Microsoft, http://downloads.planetmirror.com/pub/replacementdocs/Halo—Manual—XBX.pdf; pp. 6-7, Accessed May 22, 2007.

*The Ultimate XBOX Arcade Joystick, X-Arcade*; http://web.archive.org/web/20031001102758 http://www.x-arcade.com/xbox/shtml; 4 pages, Accessed May 22, 2007.

*UK Intellectual Property Office Examination Report* for Application No. GB0500841.2; 5 pages, May 23, 2007.

Patent Pending U.S. Appl. No. 10/699,858, entitled "Keyboard Trading System," by Howard W. Lutnick et al., 33 pages plus 11 pages of drawings, filed Oct. 31, 2003.

Provisional Application entitled, "Fully Configurable Trading Keyboard," by Howard W. Lutnick et al., 7 pages plus 3 pages of drawings, filed May 10, 2004.

Search Report under Section 17 for application No. GB0500841.2, Mar. 18, 2005.

Gamespy.com; "Console Gamepad Roundup. Getting a Grip on the hottest (and coolest) gamepads for console gaming." by Chuck Miller; Oct. 16, 2002 from http://archive/gamespy.com/hardware/october02/consolepads (accesses Jul. 2, 2008).

USPTO Office Action for U.S. Appl. No. 11/172,018, Jun. 7, 2010 (10 pages).

USPTO Pre-Brief Appeal Conference Decision for U.S. Appl. No. 11/686,695, Oct. 20, 2009 (2 pages).

Australian Examination Report for Application No. 2005206861, dated Feb. 23, 2010 (2 pages).

International Preliminary Report on Patentability for International Application No. PCT/US08/57021, dated Sep. 15, 2009 (5 pages).

International Preliminary Report on Patentability for International Application No. PCT/US2005/001084, dated Jul. 17, 2006 (9 pages).

Australian Examination Report for Application No. 2006266290, dated Jan. 22, 2009 (2 pages).

International Preliminary Report on Patentability for International Application No. PCT/US06/23762, dated Jan. 9, 2008 (6 pages).
International Preliminary Report on Patentability for International Application No. PCT/US06/23801, dated Jan. 9, 2008 (6 pages).
Canadian Examination Report for Application No. 2611879, dated Jun. 9, 2010 (3 pages).
UK Intellectual Property Office Decision on UK Patent Application No. GB0802593.4, dated Jan. 12, 2009 (12 pages).
European Patent Office Communication and Extended European Search Report for Application No. 06773508.4, dated Jul. 2, 2010 (8 pages).
*United States Patent and Trademark Office; Office Action* for U.S. Appl. No. 10/759,693, filed Jan. 15, 2004 in the name of James A. Longman; 17 pages, Jul. 5, 2005.
*United States Patent and Trademark Office; Office Action* for U.S. Appl. No. 10/759,693, filed Jan. 15, 2004 in the name of James A. Longman; 18 pages, Dec. 22, 2005.
*United States Patent and Trademark Office; Advisory Action* for U.S. Appl. No. 10/759,693, filed Jan. 15, 2004 in the name of James A. Longman; 3 pages, Apr. 20, 2006.
*United States Patent and Trademark Office; Office Action* for U.S. Appl. No. 10/759,693, filed Jan. 15, 2004 in the name of James A. Longman; 16 pages, Jul. 25, 2006.
*United States Patent and Trademark Office; Notice of Allowance and Fee(s) Due* for U.S. Appl. No. 10/759,693, filed Jan. 15, 2004 in the name of James A. Longman; 7 pages, Dec. 14, 2006.
European Search Report for Application No. EP 05 25 0211, 3 pages, Mar. 31, 2006.
USPTO Office Action for U.S. Appl. No. 11/686,695, Nov. 14, 2008 (17 pages).
USPTO Office Action for U.S. Appl. No. 11/686,695, Jun. 25, 2009 (22 pages).
Notification of Transmittal of the International Search Report and the Written Opinion of the International Searching Authority for International Application No. PCT/US08/57021; Jun. 24, 2008 (9 pages).
Schwartz, Robert A., Next-Generation Securities Market Systems: An Experimental Investigation of Quote-Driven and Order-Driven Trading, Journal of Management Information Systems, vol. 14, No. 2, pp. 57-79; Date: Fall 1997.
Forsyth, Randall, W., Editor, "After the Fall Want to bet on—or against—the depressed buck? Electronic currency trading goes mainstream", The Electronic Investor, Barron's Technology Week, cover and pp. T4-T5; Date: Nov. 22, 2004.
International Search Report for application PCT/US05/01084 (3 pages), Aug. 26, 2005.
Written Opinion of the International Searching Authority for application PCT/US05/01084 (10 pages), Aug. 26, 2005.
*Notification of Transmittal of the International Search Report and the Written Opinion of the International Searching Authority, or the Declaration* for International Application No. PCT/US06/23801; 9 pages, Oct. 5, 2007.

*UK Intellectual Property Office Examination Report* for International Application No. GB0500841.2; 2 pages, Sep. 5, 2007.
Notification of Transmittal of the International Search Report for International Application No. PCT/US06/23762, 3 pages, Dec. 1, 2006.
Written Opinion of the International Searching Authority for International Application No. PCT/US06/23762, 6 pages, Dec. 1, 2006.
USPTO Office Action for U.S. Appl. No. 11/738,824, Nov. 18, 2010 (15 pages).
Japanese Office Action with English translation for Application No. 2008-519364, mailed Nov. 16, 2010 (7 pages).
Canadian Examination Report for Application No. 2611880, dated Jul. 19, 2010 (3 pages).
Japanese Office Action with English translation for Application No. 2006-549590, mailed Dec. 14, 2010 (4 pages).
USPTO Office Action for U.S. Appl. No. 11/738,884, Aug. 31, 2010 (14 pages).
USPTO Office Action for U.S. Appl. No. 11/172,018, Oct. 13, 2010 (20 pages).
Japanese Office Action with English translation for Application No. 2008-519371, mailed Sep. 14, 2010 (5 pages).
Australian Notice of Acceptance for Application No. 2006266299, dated Apr. 13, 2011 (3 pages).
Japanese Office Action with English translation for Application No. 2008-519364, mailed Jun. 7, 2011 (4 pages).
USPTO Office Action for U.S. Appl. No. 11/738,824, Jul. 14, 2011 (17 pages).
USPTO Notice of Allowance and Fees Due and Examiner Interview Summary for U.S. Appl. No. 11/172,018, Jun. 24, 2011 (20 pages).
USPTO Office Action for U.S. Appl. No. 11/686,695, Sep. 15, 2011 (23 pages).
Japanese Office Action with English translation for Application No. 2008-519371, mailed Oct. 4, 2011 (9 pages).
Apple Computer, Inc., "Technical Note 2056: Installable Keyboard Layouts," dated Sep. 27, 2002 (retrieved from Internet Archive on Oct. 3, 2002 located at URL: http://web.archive.org/web/20021003023242/http://developer.apple.com/technotes/tn2002/tn2056.html).
Australian Notice of Acceptance for Application No. 2005206861, dated Nov. 23, 2011 (3 pages).
Japanese Office Action with English translation for Application No. 2006-549590, mailed Nov. 29, 2011 (4 pages).
Canadian Examination Report for Application No. 2553348, dated Dec. 21, 2011 (2 pages).
USPTO Office Action for U.S. Appl. No. 11/738,884, Oct. 26, 2011 (10 pages).
USPTO Notice of Allowance and Fees Due for U.S. Appl. No. 11/172,018, Oct. 17, 2011 (8 pages).

* cited by examiner

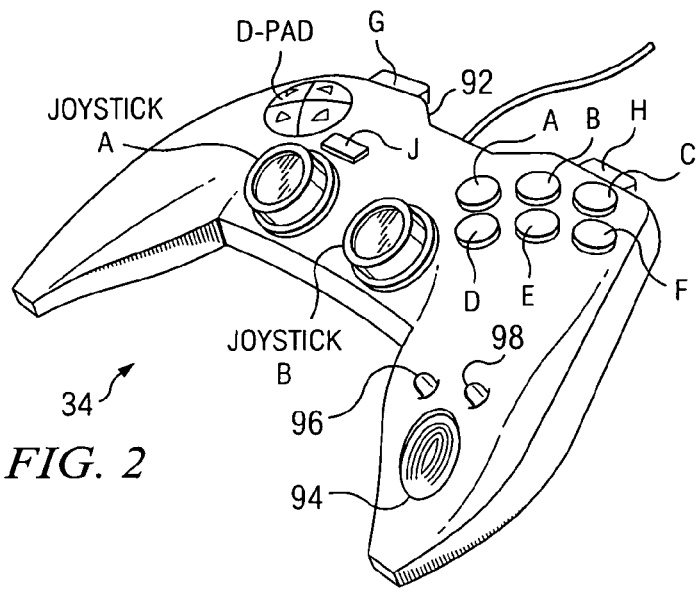

*FIG. 2*

| GAMEPAD CONTROL | TRADING SYSTEM COMMAND |
|---|---|
| D-PAD | CHANGE SELECTED INSTRUMENT IN CURRENT VIEW |
| JOYSTICK A | MOVE CURSOR AROUND SCREEN |
| JOYSTICK B (UP) | PRICE UP |
| JOYSTICK B (DOWN) | PRICE DOWN |
| JOYSTICK B (RIGHT) | SIZE UP |
| JOYSTICK B (LEFT) | SIZE DOWN |
| BUTTON G | BUY |
| BUTTON H | SELL |
| BUTTON G + BUTTON F | BID |
| BUTTON H + BUTTON F | OFFER |
| BUTTON J + BUTTON G | CANCEL BUY |
| BUTTON J + BUTTON H | CANCEL SELL |
| BUTTON J + BUTTON F + BUTTON G | CANCEL BID |
| BUTTON J + BUTTON F + BUTTON H | CANCEL OFFER |
| BUTTON A | PRICE IMPROVEMENT BEST |
| BUTTON J + BUTTON A | CYCLE PRICE IMPROVEMENT LEVEL |
| BUTTON B | DIRECT DEALING (REQUEST FOR QUOTE) |
| BUTTON J + BUTTON B | TWO-WAY DIRECT DEALING (REQUEST FOR QUOTE) |
| BUTTON C | DELETE COMMANDLINE |
| BUTTON J + BUTTON C | BACKSPACE IN COMMANDLINE |
| BUTTON E | LIMIT |
| BUTTON F | MOUSE LEFT CLICK |
| BUTTON J + BUTTON F | MOUSE RIGHT CLICK |
| BUTTON D + D-PAD | CHANGE SELECTED FIELD WITHIN SELECTED INSTRUMENT |

*FIG. 3*

SYSTEM AND METHOD FOR MANAGING A GAME CONTROLLER DEVICE FOR ELECTRONIC TRADING

RELATED APPLICATIONS

This application is a continuation-in-part of U.S. application Ser. No. 10/759,693 filed Jan. 15, 2004 now U.S. Pat. No. 7,207,885, entitled "System and Method for Using a Game Controller Device for Electronic Trading,".

TECHNICAL FIELD OF THE INVENTION

This invention relates in general to electronic trading and, more particularly, to a system and method for managing a game controller device for electronic trading.

BACKGROUND OF THE INVENTION

In recent years, electronic trading systems have gained a widespread acceptance for trading items. For example, electronic trading systems have been created which facilitate the trading of financial instruments such as stocks, bonds, currency, futures, or other suitable financial instruments. Such electronic trading systems often have a number of clients or terminals connected to a trading platform by a communications network, such as the Internet or a virtual private network, for example. Each client or terminal of such a trading system may include various input devices, such as keyboards or mouses. In some instances, users may use keyboards that are specifically designed or configured for use in an electronic trading system.

SUMMARY OF THE INVENTION

In accordance with the present invention, systems and methods for using an interface device for electronic trading are provided.

According to one embodiment, a system for electronic trading is provided. The system includes an interface application having an associated mapping module that defines a plurality of controller signal relationships. Each controller signal relationship associates a game controller signal with a trading system command associated with the electronic trading of financial instruments. The interface application is operable to receive a particular game controller signal, to determine the trading system command associated with the particular game controller signal using the mapping module, and to communicate the determined trading system command such that the trading system command is executed.

According to another embodiment, a method of electronic trading is provided. A plurality of controller signal relationships are managed. Each controller signal relationship associates a game controller signal with a trading system command associated with the electronic trading of financial instruments via a trading platform. A particular game controller signal generated by a game controller is received. The trading system command associated with the particular game controller signal is determined based on the controller signal relationships. The determined trading system command is communicated toward the trading platform such that the trading system command may be executed by the trading platform.

According to yet another embodiment, a method of managing electronic trading is provided. A plurality of controller signal relationships are stored, each controller signal relationship associating one or more of a plurality of game controller signals with one of a plurality of trading system commands associated with the electronic trading of financial instruments via a trading platform. One or more game controller signals generated by a game controller are received, and at least one of the plurality of controller signal relationships is modified based at least on the received game controller signals. For example, at least one controller signal relationship may be modified if it is determined that the received game controller signals are erroneous signals. In some embodiments, a message indicating a proposed modification of a particular controller signal relationship may be communicated to a user of the game controller. The proposed modification of the particular controller signal relationship may be implemented if a response is received from the user indicating an acceptance of the proposed modification.

According to still another embodiment, a method of managing a game controller used for electronic trading is provided. A plurality of controller signal relationships are stored, each controller signal relationship associating one or more of a plurality of game controller signals with one of a plurality of trading system commands associated with the electronic trading of financial instruments via a trading platform. A plurality of game controller signals generated by a game controller are received, one or more of the plurality of received game controller signals are determined erroneous based on the controller signal relationships, and a command to lock the game controller is communicated based on the determination of the one or more erroneous game controller signals.

Various embodiments of the present invention may benefit from numerous advantages. It should be noted that one or more embodiments may benefit from some, none, or all of the advantages discussed below.

One advantage of the invention is that a game controller, such as a gamepad or joystick, may be used to trade electronically tradable instruments or other items via a trading system. This may allow users to perform various trading functions with greater speed and accuracy than with other input devices, such as keyboards or mouses. In addition, some users may be more familiar with using a game controller than using a keyboard or mouse.

Another advantage of the invention is a user terminal may store game controller configurations for various types and/or models of game controllers such that different types and/or models of game controllers may be used interchangeably with a particular user terminal. In addition, a game controller may be configurable such that a user may configure the game controller as he or she desires. Thus, the game controller may be personalized for the user, which may further increase the speed and accuracy with which the user can perform trading functions, such as buying or selling financial instruments, for example.

Another advantage is that in some embodiments, the system may identify erroneous game controller signals received from a game controller based on a set of stored relationships between game controller signals and trading system commands. Such erroneous signals may include signals generated by manipulations of the game controller (such as pressing one or more buttons and/or moving one or more joysticks or directional pads in particular directions) that do not correspond with any trading system command, or that correspond with a trading system command that is invalid in a particular trading situation. Once the erroneous game controller signals are identified, the system may modify one or more of the stored relationships between game controller signals and trading system commands, thus effectively recalibrating particular aspects of the game controller. In some embodiments, when erroneous game controller signals are identified, the system may query the user whether the user intended to select a particular trading system command. The query may also include a proposed modification of one or more stored relationships between game controller signals and trading system commands. Based on the user's response to the query, the system may implement the proposed modification of one or more stored relationships between game controller signals and trading system commands. Thus, the system may monitor a user's behavior, detect erroneous inputs from the user, and propose and implement recalibrations of the game controller.

Other advantages will be readily apparent to one having ordinary skill in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which:

FIG. 2 illustrates an example game controller device for use in the trading system shown in FIG. 1;

FIG. 3 illustrates a table that specifies example default controller signal relationships for the game controller device shown in FIG. 2 in accordance with one embodiment of the invention;

DETAILED DESCRIPTION OF THE DRAWINGS

Example embodiments of the present invention and their advantages are best understood by referring now to FIGS. 1 through 5 of the drawings, in which like numerals refer to like parts.

In general, a game controller device, such as a gamepad or joystick, is used to interface with an electronic trading system, such as to place orders to buy or sell financial instruments, for example. Configurations for various types and/or models of game controllers may be stored and managed such that different types and/or models of game controllers may be used interchangeably at a user terminal. In addition, a game controller may be configurable such that a user may configure the game controller as he or she desires.

Figure 1:
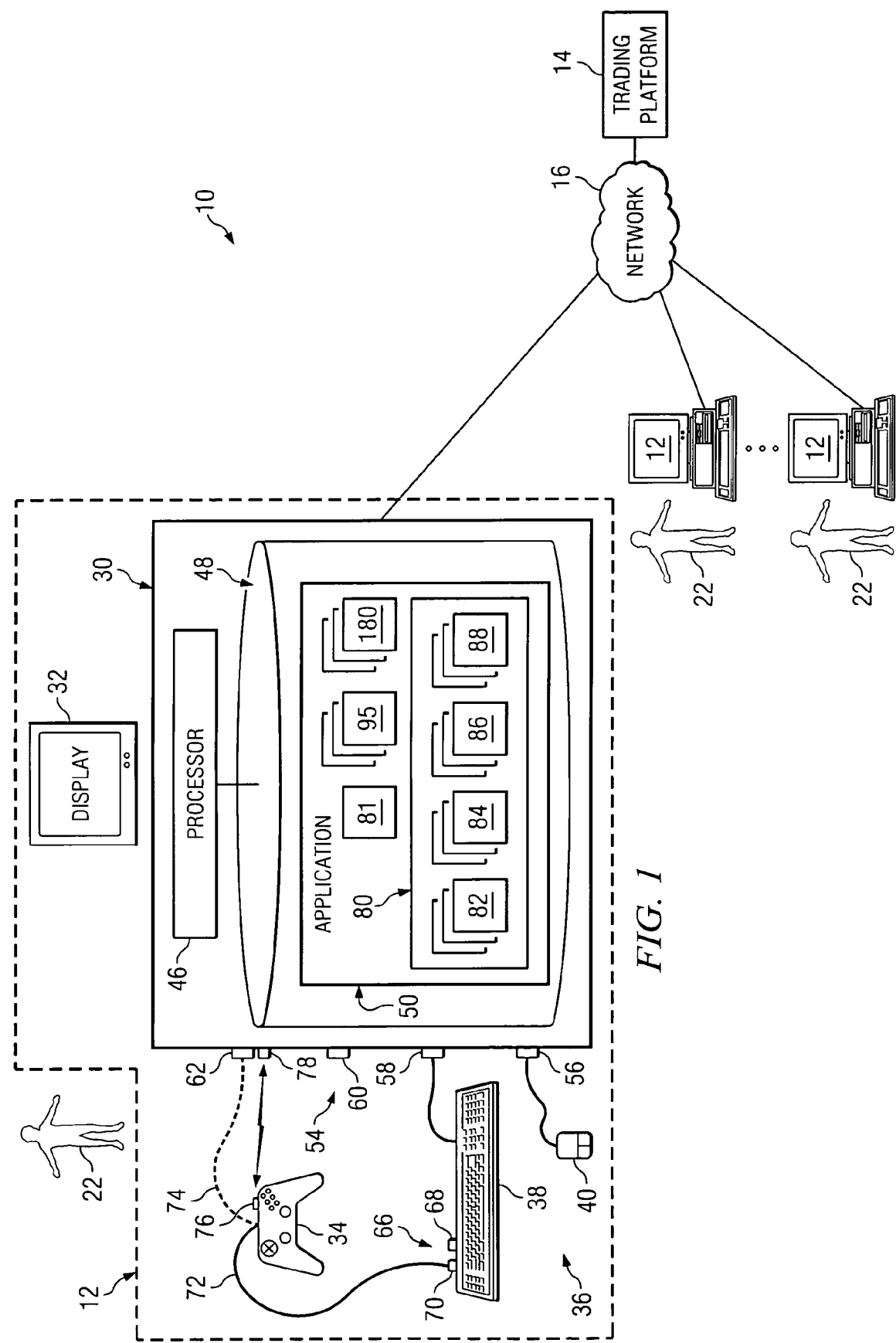
FIG. 1 illustrates an example trading system in which a user may engage in trading activity using a game controller device according to an embodiment of the present invention.

FIG. 1 illustrates an example trading system 10 in which a user may engage in trading activity using a game controller device according to an embodiment of the present invention. As shown, trading system 10 includes a number of user terminals 12 coupled to a trading platform 14 by a communications network 16. User terminals 12 provide users 22 access to engage in trading activity via trading platform 14. A user 22 is any entity, such as an individual, group of individuals or firm, that engages in trading activity via trading system 10.

Trading platform 14 is a trading architecture that facilitates the electronic trading of financial instruments, such as stocks or other equity securities, bonds, mutual funds, options, futures, derivatives, and currencies, for example, or any other suitable instruments, goods or services between users 22. Trading platform 14 may be a computer, a server, a management center, a single workstation, or a headquartering office for any person, business, or entity that seeks to manage trading between users 22 of trading system 10. Accordingly, trading platform 14 may include any suitable hardware, software, personnel, devices, components, elements, or objects that may be utilized or implemented to achieve the operations and functions of an administrative body or a supervising entity that manages or administers a trading environment.

Trading platform 14 may be operable to receive trading orders from users 22 and to manage or process those trading orders such that financial transactions between users 22 may be performed. Trading platform 14 may have a link or a connection to a market trading floor, or some other suitable coupling to any suitable element that allows for such transactions to be executed.

Communications network 16 is a communicative platform operable to exchange data or information between trading platform 14 and user terminals 30. Communications network 16 represents an Internet architecture in a particular embodiment of the present invention, which provides users 22 with the ability to electronically execute trades or initiate transactions to be delivered to an authorized exchange trading floor. In other embodiments, communications system 14 could be any packet data network (PDN) offering a communications interface or exchange between trading platform 14 and user terminals 30. Communications network 16 may alternatively be any local area network (LAN), metropolitan area network (MAN), wide area network (WAN), wireless local area network (WLAN), virtual private network (VPN), intranet, or any other appropriate architecture or system that facilitates communications in a network environment.

A user terminal 12 may include a computer system and appropriate software to allow user 22 to engage in trading activity via trading platform 14. As used in this document, the term "computer" refers to any suitable device operable to accept input, process the input according to predefined rules, and produce output, for example, a personal computer, workstation, network computer, wireless data port, wireless telephone, personal digital assistant, one or more processors within these or other devices, or any other suitable processing device.

As shown in FIG. 1, a user terminal 12 may include a terminal body 30, a display device 32, and a game controller input device 34. User terminal 12 may also include one or more additional input devices 36, such as a keyboard 38 and a mouse 40. Display device 32 may be any suitable device for displaying information to a user 22, such as an internal notebook display, a CRT monitor, or a television, for example.

Terminal body 30 includes a processing unit 46 and a memory unit 48 that stores an interface application 50, which is discussed below. Processing unit 46 may process data associated with trading system 10, which may include executing coded instructions associated with interface application 50. Memory unit 48 may be coupled to data processing unit 46 and may include one or more databases and other suitable memory devices, such as one or more random access memories (RAMs), read-only memories (ROMs), dynamic random access memories (DRAMs), fast cycle RAMs (FCRAMs), static RAM (SRAMs), field-programmable gate arrays (FPGAs), erasable programmable read-only memories (EPROMs), electrically erasable programmable read-only memories (EEPROMs), microcontrollers, or microprocessors.

Terminal body 30 also includes one or more input ports 54, each of which provides an interface for coupling game controller input device 34, one or more additional input devices 36 and/or other peripheral devices to interface application 50. Input ports 54 may include various types of interfaces, such as USB type ports (such as USB type I or type II ports, for example), keyboard ports, mouse ports, serial ports, parallel ports, or Bluetooth™ or FireWire™ ports, for example. In the example embodiment shown in FIG. 1, terminal body 30 includes a mouse port 56 for mouse 40, a keyboard port 58 for keyboard 38, a serial port 60, and a USB type port 62. In this embodiment, game controller device 34 may be coupled to either serial port 60 or USB type port 62, depending on the type of cable and/or plug provided by the game controller device 34.

In addition, keyboard 38 may include one or more input ports 64 that allow other input devices to be plugged into keyboard 38. Signals generated by an input device connected to an input port 64 provided by keyboard 38 are routed through keyboard 38 and keyboard port 58 to which keyboard 38 is coupled. In the embodiment shown in FIG. 1, keyboard 38 is a customized keyboard 38 designed for electronic trading applications, and includes a serial port 68 and a USB type port 70. In some embodiments, a particular game controller device 34 may be able to be coupled directly to an input port 54 of terminal body 30, or to an input port 66 of keyboard 38, which is in turn connected to keyboard port 58 of terminal body 30. In the embodiment shown in FIG. 1, game controller device 34 includes a USB cable 72 which may be plugged into USB type port 70 of keyboard 38 or directly into USB type port 62 of terminal body 30 (as shown by dotted line 74). Alternatively, game controller device 34 may communicate with interface application 50 at least in part via wireless communications. For example, as shown in FIG. 1, game controller device 34 may include a wireless transceiver 76 that may communicate wirelessly with a wireless transceiver 78 associated with terminal body 30. Such wireless communications may utilize any suitable wireless communications protocol or protocols. In particular embodiments, communications between wireless transceiver 76 and wireless transceiver 78 are communicated according to one or more secure wireless communication protocols or WLAN protocols, such as portions or all of the Wired Equivalent Privacy (WEP) protocol, the Robust Security Network (RSN) associated with the IEEE 802.11i protocol, the Advanced Encryption Standard (AES), the Temporal Key Integrity Protocol (TKIP), Extensible Authentication Protocol over LAN (EAPoL) algorithms or protocols (such as EAP-TTLS, PEAP, or CISCO's LEAP or EAP-FAST protocols, for example), WiFi Protected Access (WPA) protocol, or WiFi Protected Access Version 2 (WPA2) protocol, for example.

Game controller input device 34 may be any of a variety of input devices used in connection with video or computer gaming, such as a handheld video game controller, a joystick or a gamepad, for example. Some game controller devices 34 include a number of buttons as well as one or more joysticks or directional pads (D-pads). The depression or manipulation of such buttons, joysticks and/or D-pads by a user 22 generates game controller signals which may be received and interpreted by interface application 50 in order to generate commands related to the functions of trading system 10, as discussed below. Similarly, keyboard 38 and mouse 40 may generate keyboard signals and mouse signals, respectively, which may be received and interpreted by interface application 50 in order to generate commands related to the functions of trading system 10.

Interface application 50 includes one or more applications and modules that provide interfaces that allow user 22 to communicate with trading platform 14 using various input devices 34 and display device 32. For example, such applications and modules may include graphical user interface (GUI) applications that generate displays of information on display device 32, receive and interpret commands from input devices 34 in order to cause changes to the active display on display device 32 and to generate and send messages to trading platform 14, and receive and interpret messages from trading platform 14 in order to cause changes to the active display on display device 32 and/or to generate and send messages to input devices 34. Interface application 50 may include any suitable software or coded instructions for providing at least the various functionality discussed herein with reference to interface application 50.

In the embodiment shown in FIG. 1, interface application 50 includes a mapping module 80 and a configuration module 81. Mapping module 80 defines various relationships for mapping signals received from various input devices 34 with various commands regarding trading system 10. Mapping module 80 includes controller signal relationships 82, keyboard signal relationships 84, and mouse signal relationships 86. Each controller signal relationship 82 associates a game controller signal generated by a game controller device 34 with a trading system command associated with trading system 10. Each trading system command may be a control instruction to alter or manipulate the current display shown on display device 32 (such as an instruction to move a cursor across the display 32, for example) and/or a trading instruction that may be communicated to or from trading platform 14 (such as an instruction to buy, sell, or increase a price, for example).

Mapping module 80 may include sets of such controller signal relationships 82 for various types or models of game controller devices 34, as well as for various users 22. Thus, if more than one type or model of game controller device 34 is used with a particular user terminal 30, controller signal relationships 82 specific to each type or model of game controller device 34 may be stored in and retrieved from mapping module 80. In addition, if more than one user 22 uses a particular user terminal 30, controller signal relationships 82 specific to each such user may be stored in and retrieved from mapping module 80. The controller signal relationships 82 for each type or model of game controller device 34 and/or for each user 22 may be configurable or reconfigurable such that each user 22 may create his or her own desired configuration. In addition, each type or model of game controller device 34 may have a default configuration of controller signal relationships 82 maintained by mapping module 80. In an example embodiment, game controller signals may be communicated according to a MICROSOFT DirectX™ protocol. In such an embodiment, mapping module 80 may include algorithms or other software functionality for mapping the received DirectX™ game controller signals to trading system commands that may be communicated to and understood by trading platform 14.

Similar to controller signal relationships 82, each keyboard signal relationship 84 associates a keyboard signal generated by a keyboard 38 with a trading system command associated with trading system 10. Similarly, each mouse signal relationship 86 associates a mouse signal generated by a mouse 40 with a trading system command associated with trading system 10.

Mapping module 80 may also include one or more sets of feedback signal relationships 88, each associating a signal generated by trading platform 14 with a controller feedback command. Controller feedback commands are commands that may be used by game controller device 34 to provide feedback to a user 22 of game controller device 34. For example, controller feedback commands may include commands which cause game controller device 34 to rumble (i.e., vibrate) or light up. In one embodiment, feedback signal relationships 88 for a particular game controller device 34 include a relationship between an "executed trade" signal generated by trading platform 14 and a "rumble" command for game controller device 34. Thus, when trading platform 14 executes a trade involving a user 22, trading platform 14 generates and communicates an "executed trade" signal to interface application 50, which translates the signal into a "rumble" command and communicates the "rumble" command to game controller device 34, thus causing the game controller device 34 to vibrate.

Configuration module 81 cooperates with mapping module 80 to allow users 22 to configure (or generate) and/or reconfigure various controller signal relationships 82. In some embodiments, configuration module 81 provides a controller configuration GUI on display device 32 that allows a user 22 to configure, or generate, a set of controller signal relationships 82 associated with an unconfigured game controller device 34, as well as to reconfigure the set of controller signal relationships 82 associated with a previously configured game controller device 34. In a particular embodiment, the controller signal relationships 82 associated with a game controller device 34 may be reconfigured any number of times.

Mapping module 80 and configuration module 81 may include all or portions of the software or coded instructions associated with interface application 50. Mapping module 80 and configuration module 81 may also be partially or completely integrated. In addition, multiple instances of mapping module 80 and/or configuration module 81 may be provided by application 50.

FIG. 2 illustrates an example game controller device 34 for use in trading system 10. Game controller device 34 is a gamepad that includes a D-pad, a pair of joysticks (Joystick A and Joystick B), and nine buttons (Button A through Button J). FIG. 3 illustrates a table 90 that specifies example default controller signal relationships 82 for the game controller device 34 of FIG. 2 in accordance with one embodiment of the invention. As shown in FIG. 3, each controller signal relationship 82 is a relationship between the signal(s) produced by the manipulation of one or more gamepad controls and a trading system command. In this particular embodiment, a pair of buttons—buttons "G" and "H"—located on a front surface 92 of game controller device 34 correspond with the commands "Buy" and "Sell," respectively. Thus, a user 22 may quickly and easily enter "Buy" and "Sell" commands using his or her index fingers.

Figure 4:
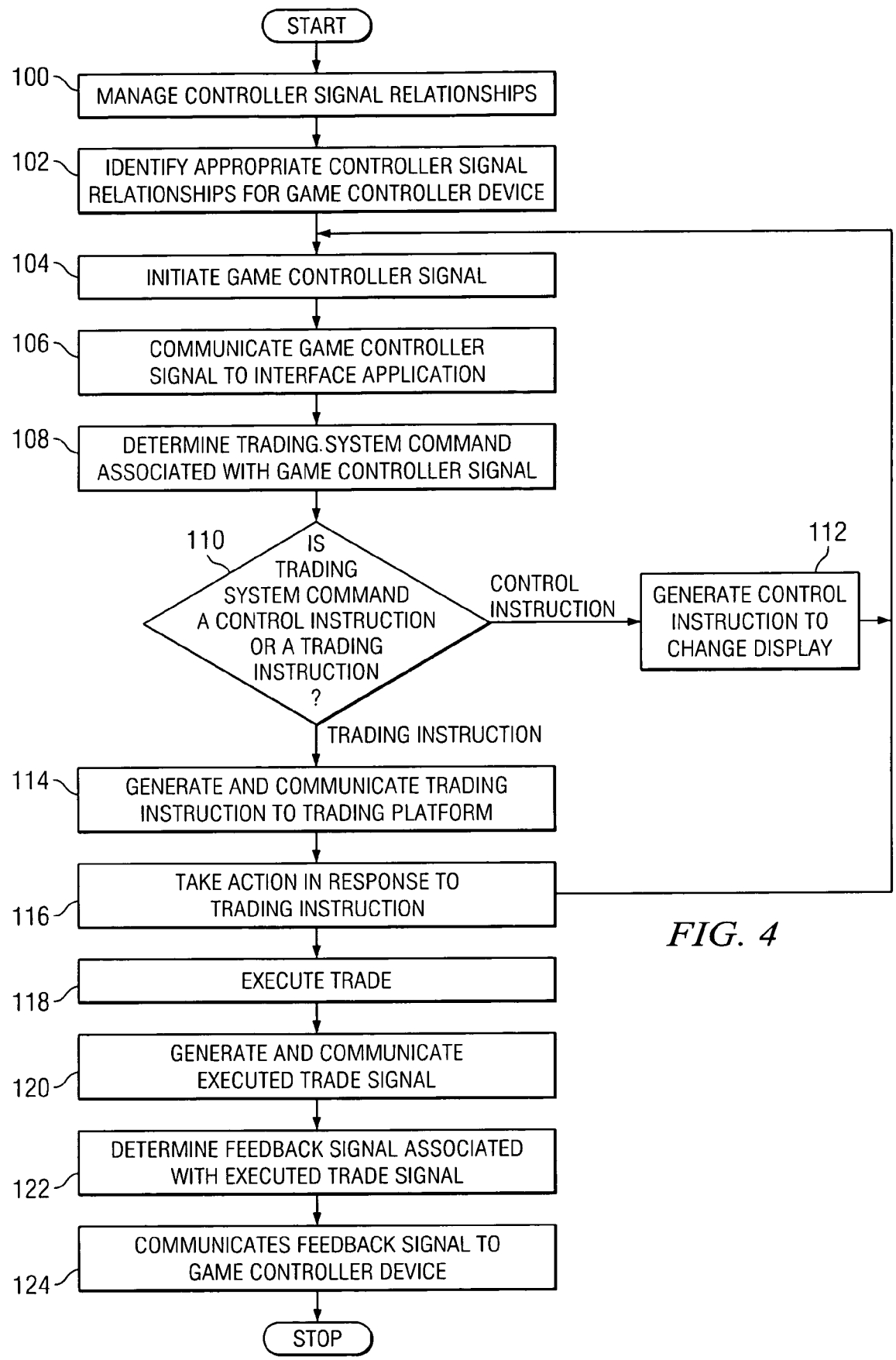
FIG. 4 illustrates an example method of a user engaging in electronic trading via a trading platform using the game controller device shown in FIG. 2 and configured according to FIG. 3.

FIG. 4 illustrates an example method of a user 22 engaging in electronic trading via trading platform 14 using the game controller device 34 shown in FIG. 2 and configured as described above according to an embodiment of the present invention. In this embodiment, the game controller device 34 is connected to a serial port 68 provided by a keyboard 38 at a user terminal 12, which in turn is connected to a keyboard port 58 of the terminal body 30 of the user terminal 12. Thus, game controller signals generated by game controller device 34 are routed to application 50 via keyboard 38.

At step 100, mapping module 80 of interface application 50 manages various sets of controller signal relationships 82, keyboard relationships 84, and mouse relationships 86 which map input signals with commands associated with trading activity within trading system 10. The controller signal relationships 82 include the set of relationships shown in FIG. 3, which are the specific to the type and model of game controller device 34. At step 102, the appropriate set of controller signal relationships 82 for game controller device 34 are identified from mapping module 80. This may involve any suitable steps or processes. For example, interface application 50 may automatically identify the type and/or model of game controller device 34 based on signals or messages received from game controller device 34, such as a control message, for example. As another example, the user 22 may identify the type and/or model of game controller device 34 using a GUI displayed to the user 22 by interface application 50, such as by selecting the appropriate type and/or model from a list of different game controller device types and/or models. In addition, if user 22 had previously reconfigured the controller signal relationships 82 for game controller device 34, interface application 50 may identify the appropriate controller signal relationships 82 for user 22 and game controller device 34. For example, interface application 50 may identify user 22 (such as from a user ID entered by user 22, for example) and present to the user 22 a display listing one or more sets of controller signal relationships 82 that have been stored at mapping module 80 in association with user 22. User 22 may then select from the list the desired set of controller signal relationships 82.

At step 104, user 22 initiates a game controller signal by moving the D-pad or joysticks and/or depressing one or more buttons of game controller device 34. At step 106, the game controller signal is communicated from game controller device 34 to application 50 via serial port 68, keyboard 38, and keyboard port 58. At step 108, interface application 50 determines the trading system command associated with the received game controller signal using the appropriate controller signal relationships 82 identified at step 102, and acts accordingly. At step 110, interface application 50 determines whether the determined trading system command is a control instruction to alter or manipulate the current display shown on display device 32 or a trading instruction to be communicated to trading platform 14. If the trading system command is a control instruction, interface application 50 generates the control instruction at step 112, which results in the appropriate change or manipulation to the current display. For example, if the game controller signal was generated by user 22 moving Joystick A (which is associated with a "move cursor" command, as shown in FIG. 3), interface application 50 will cause the cursor to be moved around the screen.

Alternatively, if the trading system command is a trading instruction, interface application 50 generates and communicates the appropriate trading instruction to trading platform 14 at step 114. The appropriate action is taken by trading platform 14 in response to the received trading instruction at step 116. For example, if the game controller signal was generated by user 22 depressing both Button 7 and Button 6 (which is associated with a "bid" command, as shown in FIG. 3), interface application 50 will generate and communicate to trading platform 14 an instruction to place a particular bid for user 22 at step 114, and trading platform 14 will receive the instruction and place the bid on trading platform 14 at step 116. Steps 104 through 116 are repeated as user 22 continues to interact with interface application 50 using game controller device 34 in order to engage in trading activity with trading platform 14.

At step 118, trading platform 14 executes a trade between a buy order placed by user 22 and a sell order placed by another user 22 of trading system 10. At step 120, trading platform 14 generates and communicates to interface application 50 a signal indicating that the buy order was executed for user 22. At step 122, interface application 50 determines, using appropriate feedback signal relationships 88, that the received signal is associated with a "rumble" controller feedback command. At step 124, interface application 50 communicates the "rumble" command to game controller device 34, which causes game controller device 34 to rumble, or vibrate.

Figure 5:
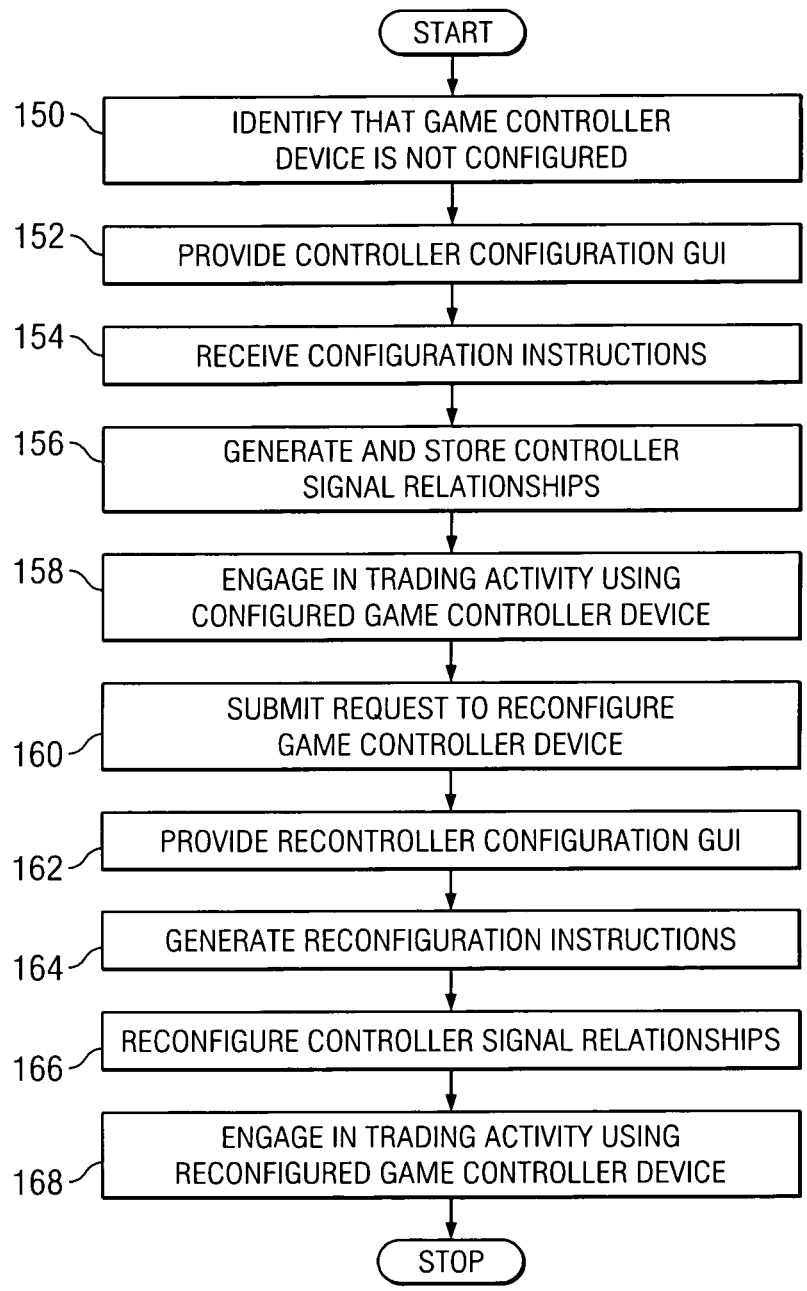
FIG. 5 illustrates an example method of configuring and reconfiguring the controller signal relationships associated with a game controller device according to one embodiment of the invention.

FIG. 5 illustrates an example method of configuring and reconfiguring the controller signal relationships 82 associated with a game controller device 34 according to one embodiment of the invention. At step 150, interface application identifies that a game controller device 34 connected to terminal body 30 is not configured. At step 152, configuration module 81 provides a controller configuration GUI on display device 32 that allows user 22 to configure, or generate, a set of controller signal relationships 82 for the unconfigured game controller device 34. At step 154, user 22 generates and communicates configuration instructions to configuration module 81 via the controller configuration GUI, such as by making selections using the game controller device 34 or another input device 36, such as a keyboard 38 or mouse 40. At step 156, configuration module 81 generates controller signal relationships 82, which are stored by mapping module 80 in association with the game controller device 34 and/or user 22. At step 158, user 22 engages in trading via trading platform 14 using the configured game controller device 34.

At some subsequent time, user 22 wishes to reconfigure one or more of the controller signal relationships 82 for the game controller device 34. At step 160, user 22 submits a request to reconfigure controller signal relationships 82 for game controller device 34. At step 162, configuration module 81 provides a controller reconfiguration GUI on display device 32 that allows user 22 to reconfigure the existing set of controller signal relationships 82 for the game controller device 34. The controller reconfiguration GUI may be similar or identical to the controller configuration GUI discussed above with reference to step 152. At step 164, user 22 generates and communicates reconfiguration instructions to configuration module 81 via the controller reconfiguration GUI, such as by making selections using the game controller device 34 or another input device 36, such as a keyboard 38 or mouse 40. At step 166, configuration module 81 reconfigures, or changes, one or more controller signal relationships 82, which changes are then stored by mapping module 80. At step 168, user 22 engages in trading via trading platform 14 using the reconfigured game controller device 34.

Modifications, additions, or omissions may be made to the method without departing from the scope of the invention. Additionally, steps may be performed in any suitable order without departing from the scope of the invention.

Detecting Erroneous Game Controller Inputs

In some embodiments, interface application 50 is capable of identifying and/or managing erroneous game controller signals received from a game controller device 34. In general, interface application 50 may identify erroneous received game controller signals based on a set of stored controller signal relationships 82 between game controller signals generated by a game controller device 34 and trading system commands associated with trading system 10. As discussed above, game controller signals may be generated by manipulations of a game controller device 34, such as pressing one or more buttons and/or moving one or more joysticks or D-pads in particular directions, for example. Erroneous signals that may be identified by interface application 50 may include, for example, (1) game controller signals that do not correspond with any trading system command stored in the set of controller signal relationships 82; (2) game controller signals that correspond (based on controller signal relationships 82) with a trading system command that is invalid in a particular trading situation; and (3) game controller signals that are followed by one or more subsequent game controller signals received from the game controller in order to cancel or undo the original game controller signals (or the trading system command associated with the original game controller signals). For example, suppose interface application 50 receives from a game controller device 34 game controller signals generated by a user simultaneously depressing button "B" and moving joystick "A" to an upper-left position. Interface application 50 may determine that this combination of game controller signals does not correspond with any trading system command stored in a set of controller signal relationships 82 maintained by mapping module, and that the received game controller signals are thus erroneous. As another example, interface application 50 may determine that, based on a particular controller signal relationship 82, this combination of game controller signals corresponds with a trading system command that is invalid in the particular current trading situation, and that the received game controller signals are thus invalid. For instance, the received game controller signals may correspond with a "Buy" command, which command may be invalid or improper in the current state of the user's trading activity. As yet another example, interface application 50 may receive from the game controller device 34 one or more subsequent game controller signals that correspond, based on one or more controller signal relationships 82, with a command to undo or cancel the original game controller signals. Thus, interface application 50 may determine that the original game controller signals were erroneous.

After one or more erroneous game controller signals are identified, configuration module 81 may modify one or more of the stored game controller relationships 82, thus effectively recalibrating particular aspects of the game controller. In some embodiments, if one or more erroneous game controller signals are identified, configuration module 81 may generate and/or communicate a message to the user 22 of the game controller device 34 (such as via a display device 32, for example). Such message may (1) indicate that erroneous signals were received, (2) query the user 22 regarding the user's intent with respect to the erroneous signals, and/or (3) propose a modification of one or more game controller relationships 82.

In certain embodiments, interface application 50 may determine, based on the received erroneous game controller signals and the set of game controller relationships 82, one or more particular trading system commands that the user 22 may have intended to select. For example, again supposing game controller signals generated by depressing button "B" and moving joystick "A" to an upper-left position are received and determined erroneous, interface application 50 may determine that the user 22 may have intended to select (a) an "increase order by 5 units" trading system command corresponding with depressing button "B" and moving joystick "A" to an upper position, or (b) a "decrease bid price by 1 tick" trading system command corresponding with depressing button "B" and moving joystick "A" to a leftward position. Interface application 50 may utilize any suitable algorithms or methodology to determine such potentially-intended trading system commands. For example, application 50 may process prior trading history associated with the particular user to make the determination. In addition, interface application 50 may use other parameters associated with the current trade to make this determination.

Such identified potentially-intended trading system commands may be listed in the message communicated to user 22. For example, the message may list the identified potentially-intended trading system commands and ask the user 22 whether the user 22 intended to select one of such commands. In addition, for each identified trading system command, the message may propose a modification of the corresponding game controller relationship 82 that would map that identified trading system command to the game controller signals received from the user 22. Thus, continuing the example discussed above, the message communicated to the user 22 may include the following proposed modifications to game controller relationships 82:

(a) mapping the signals generated by depressing button "B" and moving joystick "A" to an upper-left position with the "increase order by 5 units" trading system command (currently mapped to depressing button "B" and moving joystick "A" to an upper position, as discussed above); and (b) mapping the signals generated by depressing button "B" and moving joystick "A" to an upper-left position with the "decrease bid price by 1 tick" trading system command (currently mapped to depressing button "B" and moving joystick "A" to a leftward position, as discussed above).

If the user 22 responds to the message (such as via the game controller device 34) by selecting one of the proposed mapping modifications, configuration module 81 may implement the proposed modification to the relevant game controller relationship 82. In this manner, interface application 50 may monitor a user's behavior, detect erroneous inputs from the user, and propose and implement recalibrations of the user's game controller device 34.

Interface application 50 may store game controller signals received from one or more game controller devices 34 in one or more signal logs 180. In some embodiments, interface application 50 identifies erroneous game controller signals received from a game controller device 34 based on game controller signals stored in an associated signal log 180. In addition, configuration module 81 may modify one or more controller signal relationships 82, or propose modifications of one or more controller signal relationships 82, based on an analysis of one or more signal logs 180. For example, configuration module 81 may modify or propose a modification of a particular controller signal relationship 82 if a particular number or frequency of erroneous signals are identified in a signal log 180. In some embodiments, if interface application 50 determines based on signal log 180 that a particular erroneous signal has been received from a game controller device 34 a number of times or with a frequency that equals or exceeds a predetermined numerical threshold, configuration module 81 of interface application 50 may communicate to the user 22 of the game controller device 34 a message indicating a proposed modification of one or more particular controller signal relationships 82.

For example, if game controller signals stored in a signal log 180 indicate that a user has erroneously moved a joystick to the down-right position rather than the straight-down position when attempting to implement a particular trading command more than a threshold number of times (say, for example, 10 times) or more than a threshold frequency (say, for example, twice per hour), configuration module 81 may communicate to the user 22 of the game controller device 34 a message indicating a proposed modification of a particular controller signal relationship 82 in order to correspond the particular trading command with the down-right position (rather than the straight-down position) of the joystick. Such message may be communicated to the user 22 via a display device 32, for example. If the user 22 communicates a response to the message that indicates an acceptance of the proposed modification of the particular controller signal relationship 82, configuration module 81 may implement the modification of the particular controller signal relationship 82.

Figure 6:
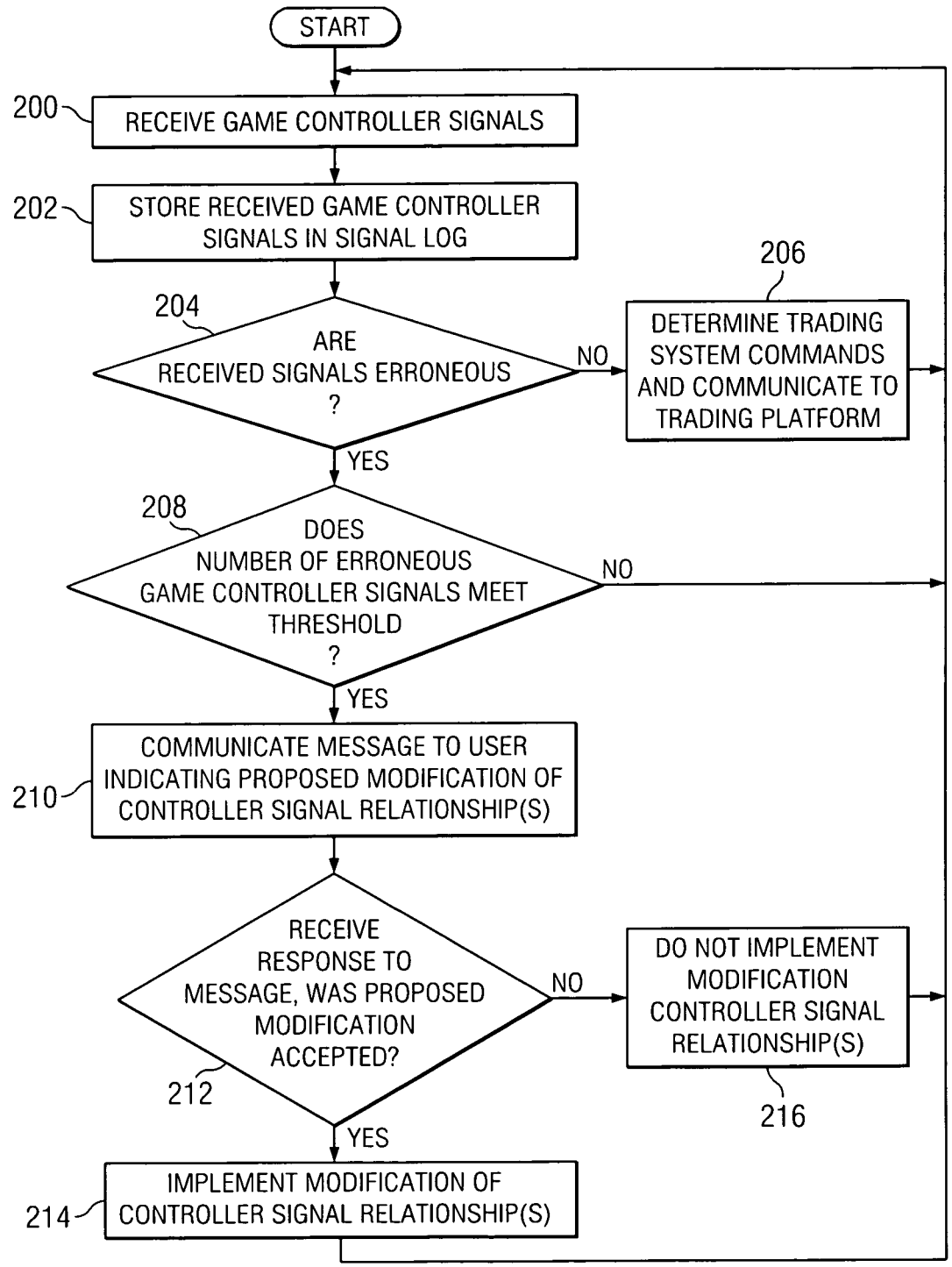
FIG. 6 illustrates an example method of detecting erroneous game controller signals and reconfiguring controller signal relationships associated with a game controller device according to one embodiment of the invention.

FIG. 6 illustrates an example method of detecting erroneous game controller signals and reconfiguring controller signal relationships 82 associated with a game controller device 34 according to one embodiment of the invention. At step 200, interface application 50 receives one or more game controller signals generated by a game controller device 34 being manipulated by a user 22, such as by pressing one or more buttons and/or moving one or more joysticks or D-pads in particular directions, for example. At step 202, interface application 50 may store received game controller signals in a signal log 180 associated with the game controller device 34. At step 204, interface application 50 determines whether the one or more game controller signals received at step 200 are erroneous based on a set of stored controller signal relationships 82 between game controller signals generated by a game controller device 34 and trading system commands associated with trading system 10. As discussed above, such erroneous signals may include, for example, (1) game controller signals that do not correspond with any trading system command stored in the set of controller signal relationships 82; (2) game controller signals that correspond (based on controller signal relationships 82) with a trading system command that is invalid in a particular trading situation; or (3) game controller signals followed by subsequent game controller signals to cancel or undo the original game controller signals (or the trading system command associated with the original game controller signals).

If the received game controller signal(s) are determined not to be erroneous at step 204, the trading system command(s) associated with such received game controller signals may be determined by interface application 50 and communicated to trading platform 14 at step 206. The method may return to step 200 to receive additional game controller signals from the game controller device 34. Alternatively, if the received game controller signal(s) are determined to be erroneous, the method proceeds to step 208 where interface application 50 may further determine, based on signal log 180, whether the particular erroneous game controller signal(s) has been received form the game controller device 34 a predetermined threshold number of times or with a predetermined threshold frequency, as discussed above. If the particular erroneous game controller signal(s) has not been received the predetermined threshold number of times or with the predetermined threshold frequency, the method may return to step 200 to receive additional game controller signals from the game controller device 34. However, if the particular erroneous game controller signal(s) has been received the predetermined threshold number of times or with the predetermined threshold frequency, at step 210 configuration module 81 may communicate to the user 22 of the game controller device 34 (via a display device 32, for example) a message indicating a proposed modification of one or more particular controller signal relationships 82.

At step 212, interface application 50 receives a response to the message from the user 22 of the game controller device 34. If the response indicates an acceptance of the proposed modification of the particular controller signal relationship(s) 82, configuration module 81 may implement the modification of the particular controller signal relationship(s) 82 at step 214. The method may return to step 200 to receive additional game controller signals from the game controller device 34. If the response indicates a denial of the proposed modification of the particular controller signal relationship(s) 82, configuration module 81 may not implement the modification, as indicated at step 216, and the method may return to step 200 to receive additional game controller signals from the game controller device 34.

Managing Default Settings

In some embodiments, interface application 50 is capable of managing default settings for the configuration of a game controller device 34, which may include managing default settings for game controller relationships 82. Using any suitable statistical modeling or analysis, interface application 50 may determine the number and/or frequency of instances of one or more particular received game controller signals stored in one or more signal logs 180. Based on such determined number and/or frequency of instances of one or more particular received game controller signals, configuration module 81 may modify or propose a modification of one or more particular controller signal relationships 82, such as to tailor the configuration of the game controller device 34 to the trading activity of the user 22. In particular embodiments, configuration module 81 may communicate a message to the user 22 proposing a modification of one or more particular controller signal relationships 82 if the number and/or frequency of instances of one or more particular received game controller signals exceeds a predetermined threshold.

For example, suppose each depression of button A increases the bid size for a bid order by one unit (e.g. one share). Thus, a particular controller signal relationship 82 corresponds the game controller signal generated by pressing button A with the trading command of increasing the bid size for a bid order by one unit. Further suppose that a particular user 22 often submits bid orders in sizes of multiples of five units (e.g., 5 shares, 10 shares, 15 shares, etc.) by pressing button A in multiples of five repetitions. Based on the number and/or frequency of instances of receiving game controller signals for submitting bid orders in sizes of multiples of five units, configuration module 81 may communicate a message to user 22 proposing to modify the particular controller signal relationship 82 such that each depression of button A increases the bid size for a bid order by five units. If the user 22 accepts the proposed modification of the particular controller signal relationship 82, configuration module 81 may implement the modification. It should be understood that this is merely an example, and that configuration module 81 may modify or propose a modification of any one or more controller signal relationships 82 based on the determined number and/or frequency of instances of one or more particular received game controller signals.

Figure 7:
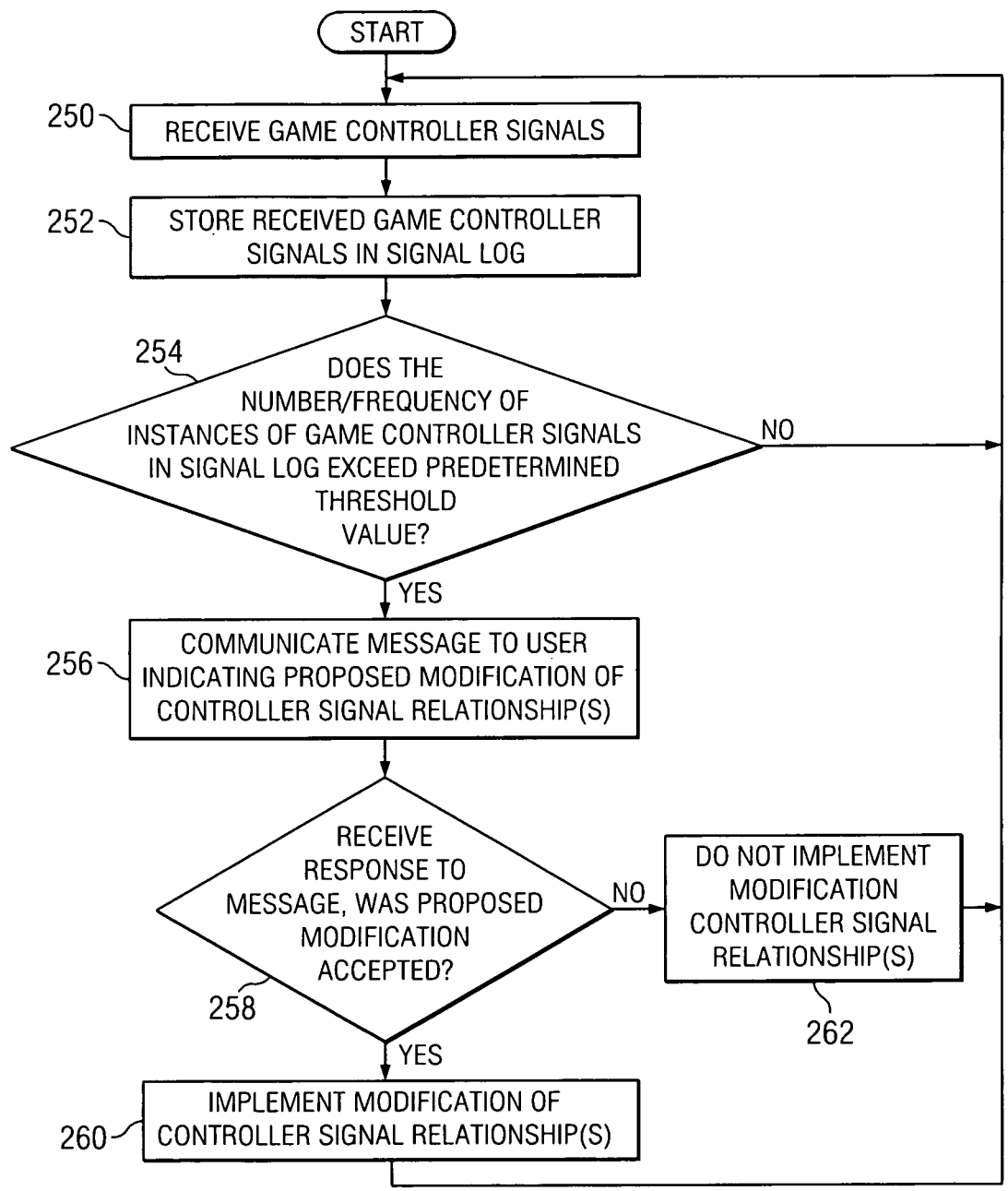
FIG. 7 illustrates an example method of determining the number or frequency of particular received game controller signals and reconfiguring controller signal relationships associated with a game controller device according to one embodiment of the invention.

FIG. 7 illustrates an example method of determining the frequency of particular received game controller signals and reconfiguring controller signal relationships associated with a game controller device 34 according to one embodiment of the invention. At step 250, interface application 50 receives one or more game controller signals generated by a game controller device 34 being manipulated by a user 22, such as by pressing one or more buttons and/or moving one or more joysticks or D-pads in particular directions, for example. At step 252, interface application 50 may store received game controller signals in a signal log 180 associated with the game controller device 34. At step 254, interface application 50 determines whether the number and/or frequency of instances of one or more particular received game controller signals stored in signal log 180 meet or exceed a predetermined threshold value. For example, interface application 50 may determine the frequency at which user 22 submits particular trading system commands over time and/or in particular trading situations, and determine whether such frequency exceeds a predetermined threshold frequency. For instance, interface application 50 may determine the frequency at which user 22 enters signals for submitting trading orders in multiples of 10 shares, as opposed to submitting trading orders of other sizes, and whether the determined frequency exceeds a threshold frequency predetermined for such signals.

If the determined number and/or frequency of instances of one or more particular received game controller signals does not meet or exceed the predetermined threshold value, the method may return to step 250 to continue receiving game controller signals. However, if the determined number and/or frequency of instances of one or more particular received game controller signals meets or exceeds the predetermined threshold value, configuration module 81 may communicate a message to the user 22 proposing a modification of one or more particular controller signal relationships 82, as indicated at step 256. At step 258, a response to the message is received from the user 22 of the game controller device 34. If the response indicates an acceptance of the proposed modification of the particular controller signal relationship(s) 82, configuration module 81 may implement the modification of the particular controller signal relationship(s) 82 at step 260. The method may return to step 250 to receive additional game controller signals from the game controller device 34. If the response indicates a denial of the proposed modification of the particular controller signal relationship(s) 82, configuration module 81 may not implement the modification, as indicated at step 262, and the method may return to step 250 to receive additional game controller signals from the game controller device 34.

Security Features

Trading system 10 may include one or more various security features for managing access to game controller device 34 and/or trading platform 14. For example, in particular embodiments, as shown in FIG. 2, game controller device 34 includes a fingerprint reading device 94 operable to obtain an image 95 of a user's fingerprint or thumbprint such that game controller device 34 may only be used by authorized users 22. A user 22 may place his finger or thumb against fingerprint reading device 94, which may obtain (e.g. scan) an image 95 of the fingerprint or thumbprint. The fingerprint image 95 may be stored by game controller device 34 and/or interface application 50. In order to begin a trading session using game controller device 34, a user 22 may be required to scan his or her fingerprint using fingerprint reading device 94. If the user 22's fingerprint image matches the stored fingerprint image 95 of an authorized user 22, the user 22 may begin using game controller device 34. For example, game controller device 34 may remain locked when unused and may be unlocked when fingerprint reading device 94 reads an authorized fingerprint. Alternatively, if the user 22's fingerprint image does not match the stored fingerprint image 95 of an authorized user 22, the user 22 may be prevented from using game controller device 34, at least for accessing trading platform 14. For example, game controller device 34 may remain locked upon fingerprint reading device 94 reading the unauthorized fingerprint.

Fingerprint reading device 94 may include any suitable device or devices operable to obtain an image (or other data) of a finger or thumb print, such as optical scanning devices or capacitance scanning devices, for example. Fingerprint images 95 may be stored in any suitable location, such as within game controller device 34 or by memory 48. In addition, software for analyzing fingerprint images 95, including comparing stored fingerprint images 95 for authorized users 22 with newly received fingerprint images (for determining whether a user 22 is authorized, for example), may be associated with and/or stored within game controller device 34 or by memory 48. For example, in the embodiment shown in FIG. 1, such functionality is provided by interface application 50.

In addition, in the embodiment shown in FIG. 2, game controller device 34 may include an access granted indicator 96 and an access denied indicator 98. Access granted indicator 96 may indicate when an authorized fingerprint image has been obtained by fingerprint reading device 94 (thus allowing game controller device 34 to be used by the user 22, as discussed above) while access denied indicator 98 may indicate when an unauthorized fingerprint image has been obtained by fingerprint reading device 94 (thus preventing game controller device 34 from being used by the user 22, as discussed above). Access granted indicator 96 and access denied indicator 98 may comprise any suitable devices for communicating data to a user 22, such as lights, bells or buzzers, for example.

In some embodiments, trading system 10 utilizes configurable security codes for regulating access to game controller device 34 and/or trading platform 14. For example, a user 22 may enter a user-selected security code including a series of one or more game controller signals generated by manipulating the various features of the game controller device 34. The user-selected security code may then be stored, such as by game controller device 34 or interface application 50, for example. The user 22 may then be required to enter the stored security code (using the game controller device 34) to begin new trading sessions.

In some embodiments, the game controller device 34 may lock automatically, such as at the end of a trading session, after some predetermined period of non-use, or otherwise. In other embodiments, the user 22 may select a first, locking security code for locking the game controller device 34 and a second, unlocking security code for unlocking the game controller device 34. The user 22 may then use the locking and unlocking security codes for locking and unlocking the game controller device 34 as desired. The user-selected locking and unlocking security codes may be the same or different codes. For example, suppose a user 22 selects a locking security code by submitting the following sequence of actions: pressing button A, pressing button F, pressing button E, and moving joystick A right. Further suppose the user 22 selects an unlocking security code having the same or a different sequence of actions. Thus, any suitable sequence of actions will serve to lock and/or unlock the game controller device 34 for use.

Game controller device 34 may also include an auto-lock feature that locks the game controller device 34 automatically in response to receiving a particular number of erroneous inputs or a particular number of simultaneous inputs. For example, game controller device 34 may lock itself if a predetermined number (or more) of erroneous inputs are received consecutively, such as if a user 22 submits a particular number of consecutive improper commands. As another example, game controller device 34 may lock itself if a predetermined number (or more) of inputs are received consecutively, such as if the game controller device 34 is dropped or grabbed accidentally. Such features may reduce the number of unintended or improper game controller signals being communicated by a game controller device 34.

Although an embodiment of the invention and its advantages are described in detail, a person skilled in the art could make various alterations, additions, and omissions without departing from the spirit and scope of the present invention as defined by the appended claims.

What is claimed is:

1. A method for managing electronic trading, comprising:
storing, by at least one processor, a plurality of controller signal relationships, each controller signal relationship associating one or more of a plurality of game controller signals with one of a plurality of trading system commands associated with the electronic trading of financial instruments via a trading platform, the plurality of controller signal relationships associating at least one trading system command with one or more controller signals comprising directional data associated with movement of a joystick configured for movement away from a center position in a plurality of directions spanning 360 degrees;
receiving, by the at least one processor, one or more game controller signals generated by a game controller, the one or more game controller signals comprising a plurality of directional inputs of at least one joystick generated by movements by at least one joystick in at least one direction, said at least one joystick configured for movement away from a center position in a plurality of directions spanning 360 degrees;
storing, by the at least one processor a log of the one or more received game controller signals generated by the game controller, the log comprising the plurality of directional inputs of the at least one joystick;
determining, based at least on the log of received game controller signals comprising the plurality of directional inputs, that one or more particular received game controller signals are erroneous, in which the one or more particular erroneous game controller signals comprise at least one of the plurality of directional inputs; and
based on the act of determining that at least one of the plurality of directional inputs are erroneous, modifying, by the at least one processor, at least one of the plurality of controller signal relationships based at least on the one or more received game controller signals, in which the act of modifying at least one of the plurality of controller signal relationships comprises modifying the directional data associated with the at least one trading system command.

2. The method of claim 1, in which the act of determining that the one or more particular received determining, based on the controller signal relationships, that the one or more particular received game controller signals do not correspond with any of the plurality of trading system commands; and
wherein modifying at least one of the plurality of controller signal relationships based at least on the one or more received game controller signals comprises modifying at least one of the plurality of controller signal relationships based at least on the determination that the one or more particular received game controller signals do not correspond with any of the plurality of trading system commands.

3. The method of claim 1, wherein modifying at least one controller signal relationship based on the one or more particular erroneous game controller signals comprises:

based at least on the one or more particular erroneous game controller signals, communicating a message indicating a proposed modification of a particular controller signal relationship;

receiving a response to the message, the response indicating an acceptance of the proposed modification of the particular controller signal relationship; and based on the received response, implementing the proposed modification of the particular controller signal relationship.

4. The method of claim 1, wherein determining, based at least on the log of received game controller signals, that one or more particular received game controller signals are erroneous comprises:

determining a particular trading system command associated with the one or more particular received game controller signals based on the controller signal relationships; and determining that the particular trading system command is an invalid command in a particular state of trading activity in which the one or more particular game controller signals are received.

5. The method of claim 1, wherein determining, based at least on the log of received game controller signals, that one or more particular received game controller signals are erroneous comprises:

determining a particular trading system command associated with the one or more particular received game controller signals based on the controller signal relationships;

receiving from the game controller a command to cancel the determined particular trading system command; and determining that the one or more particular received game controller signals are erroneous based on the received command to cancel the determined particular trading system command.

6. The method of claim 1, comprising:

determining that the number of erroneous received game controller signals associated with a particular controller signal relationship equals or exceeds a predetermined numerical threshold greater than one; and responsive to determining that the number of erroneous received game controller signals associated with a particular controller signal relationship equals or exceeds a predetermined numerical threshold greater than one, modifying the particular controller signal relationship based on the one or more particular erroneous game controller signals.

7. The method of claim 1, comprising:

determining that the number or pattern of erroneous received game controller signals associated with a particular controller signal relationship equals or exceeds a predetermined numerical threshold greater than one; and responsive to determining that the number or pattern of erroneous received game controller signals associated with a particular controller signal relationship equals or exceeds a predetermined numerical threshold greater than one, communicating a message indicating a proposed modification of the particular controller signal relationship;

receiving a response to the message, the response indicating an acceptance of the proposed modification of the particular controller signal relationship; and based on the received response, implementing the proposed modification of the particular controller signal relationship.

8. The method of claim 1, wherein modifying at least one of the plurality of controller signal relationships based at least on the one or more received game controller signals comprises:

based at least on the one or more received game controller signals, communicating a message indicating a proposed modification of a particular controller signal relationship;

receiving a response to the message, the response indicating an acceptance of the proposed modification of the particular controller signal relationship; and based on the received response, implementing the proposed modification of the particular controller signal relationship.

9. The method of claim 1, wherein modifying at least one of the plurality of controller signal relationships based at least on the one or more received game controller signals comprises recalibrating the game controller.

10. The method of claim 9, wherein recalibrating the game controller comprises at least partially recalibrating a joystick or directional pad (D-pad).

11. The method of claim 1, wherein:

the plurality of controller signal relationships includes a particular controller signal relationship associating a particular trading system command with one or more game controller signals including a first particular game controller signal associated with a directional pad (D-pad) of the game controller being controlled with a first input;

the one or more game controller signals received from the game controller comprise a second particular game controller signal generated in response to a directional pad (D-pad) of the game controller being controlled with a second input;

determining that the one or more game controller signals received from the game controller were intended to initiate the particular trading system command; and modifying the particular controller signal relationship to replace the first particular game controller signal associated with a directional pad (D-pad) of the game controller being controlled with the first input with the second particular game controller signal associated with a directional pad (D-pad) of the game controller being controlled with the second input.

12. The method of claim 1, further comprising:

determining the frequency of instances of one or more particular received game controller signals; and receiving one or more game controller signals generated by a game controller comprises receiving one or more instances of one or more of the game controller signals generated by a game controller; and wherein modifying at least one of the plurality of controller signal relationships based at least on the one or more received game controller signals comprises modifying at least one of the plurality of controller signal relationships based at least on the determined frequency of instances of one or more particular received game controller signals.

13. The method of claim 12, wherein each game controller signal is associated with a particular manipulation of a game controller.

14. The method of claim 12, comprising:

based at least on the determined frequency of instances of one or more particular received game controller signals, communicating a message indicating a proposed modification of a particular controller signal relationship;

receiving a response to the message, the response indicating an acceptance of the proposed modification of the particular controller signal relationship; and based on the received response, implementing the proposed modification of the particular controller signal relationship.

15. The method of claim 12, further comprising modifying a particular controller signal relationship associated with the particular received game controller signal if the determined frequency of instances of a particular received game controller signal exceeds a predetermined threshold frequency.

16. The method of claim 12, wherein determining the frequency of instances of one or more particular received game controller signals comprises performing a statistical analysis of the received game controller signals.

17. The method of claim 12, wherein determining the frequency of instances of one or more particular received game controller signals comprises determining the frequency of instances of one or more particular received game controller signals associated with selecting the size of a trading order.

18. A system for electronic trading, comprising:
an interface application comprising a mapping module that defines a plurality of controller signal relationships, each controller signal relationship associating one or more of a plurality of game controller signals with one of a plurality of trading system commands associated with the electronic trading of financial instruments, the plurality of controller signal relationships associating at least one trading system command with one or more controller signals comprising directional data associated with movement of a joystick configured for movement away from a center position in a plurality of directions spanning 360 degrees;
wherein the interface application is operable to:
receive one or more game controller signals generated by a game controller, the one or more game controller signals comprising a plurality of directional inputs of at least one joystick generated by movements by at least one joystick in at least one direction, said at least one joystick configured for movement away from a center position in a plurality of directions spanning 360 degrees;
store, by the at least one processor a log of the one or more received game controller signals generated by the game controller, the log comprising the plurality of directional inputs of the at least one joystick;
determine, based at least on the log of received game controller signals comprising the plurality of directional inputs, that one or more particular received game controller signals are erroneous, in which the one or more particular erroneous game controller signals comprise at least one of the plurality of directional inputs; and
based on the act of determining that at least one of the plurality of directional inputs are erroneous, modify at least one of the plurality of controller signal relationships based at least on the one or more received game controller signals, in which the act of modifying at least one of the plurality of controller signal relationships comprises modifying the directional data associated with the at least one trading system command.

19. The system of claim 18, wherein the interface application is further operable to:

determine, based on the controller signal relationships, that the one or more particular received game controller signals do not correspond with any of the plurality of trading system commands; and modify at least one of the plurality of controller signal relationships based at least on the determination that the one or more particular received game controller signals do not correspond with any of the plurality of trading system commands.

20. The system of claim 18, wherein modifying at least one controller signal relationship based on the one or more particular erroneous game controller signals comprises:
based at least on the one or more particular erroneous game controller signals, communicating a message indicating a proposed modification of a particular controller signal relationship;
receiving a response to the message, the response indicating an acceptance of the proposed modification of the particular controller signal relationship; and
based on the received response, implementing the proposed modification of the particular controller signal relationship.

21. The system of claim 18, wherein determining, based at least on the log of received game controller signals, that one or more particular received game controller signals are erroneous comprises:
determining a particular trading system command associated with the one or more particular received game controller signals based on the controller signal relationships; and
determining that the particular trading system command is an invalid command in a particular state of trading activity in which the one or more particular game controller signals are received.

22. The system of claim 18, wherein determining, based at least on the log of received game controller signals, that one or more particular received game controller signals are erroneous comprises:
determining a particular trading system command associated with the one or more particular received game controller signals based on the controller signal relationships;
receiving from the game controller a command to cancel the determined particular trading system command; and
determining that the one or more particular received game controller signals are erroneous based on the received command to cancel the determined particular trading system command.

23. The system of claim 18, further comprising a storage module operable to store a log of the one or more received game controller signals generated by the game controller;
wherein the interface application is further operable to:
determine that the number of erroneous received game controller signals equals or exceeds a predetermined numerical threshold greater than one; and
modify at least one game controller signal relationship based on the one or more particular erroneous game controller signals.

24. The system of claim 18, further comprising a storage module operable to store a log of the one or more received game controller signals generated by the game controller;
wherein the interface application is operable to:
determine that the number of erroneous received game controller signals equals or exceeds a predetermined numerical threshold greater than one;
communicate a message indicating a proposed modification of a particular controller signal relationship;

receive a response to the message, the response indicating an acceptance of the proposed modification of the particular controller signal relationship; and based on the received response, cause the proposed modification of the particular controller signal relationship to be implemented.

25. The system of claim 18, wherein modifying at least one of the plurality of controller signal relationships based at least on the one or more received game controller signals comprises:

based at least on the one or more received game controller signals, communicating a message indicating a proposed modification of a particular controller signal relationship;

receiving a response to the message, the response indicating an acceptance of the proposed modification of the particular controller signal relationship; and based on the received response, implementing the proposed modification of the particular controller signal relationship.

26. The system of claim 18, wherein modifying at least one of the plurality of controller signal relationships based at least on the one or more received game controller signals comprises recalibrating the game controller.

27. The system of claim 26, wherein recalibrating the game controller comprises at least partially recalibrating a joystick or directional pad (D-pad).

28. The system of claim 18, wherein:

the plurality of controller signal relationships includes a particular controller signal relationship associating a particular trading system command with one or more game controller signals including a first particular game controller signal associated with a directional pad (D-pad) of the game controller being controlled with a first input;

the one or more game controller signals received from the game controller comprise a second particular game controller signal generated in response to a directional pad (D-pad) of the game controller being controlled with a second input;

determining that the one or more game controller signals received from the game controller were intended to initiate the particular trading system command; and modifying the particular controller signal relationship to replace the first particular game controller signal associated with a directional pad (D-pad) of the game controller being controlled with the first input with the second particular game controller signal associated with a directional pad (D-pad) of the game controller being controlled with the second input.

29. The system of claim 18, wherein the interface application is operable to:

determine the frequency of instances of one or more particular received game controller signals; and wherein receiving one or more game controller signals generated by a game controller comprises receiving one or more instances of one or more of the game controller signals generated by a game controller; and wherein modifying at least one of the plurality of controller signal relationships based at least on the one or more received game controller signals comprises modifying at least one of the plurality of controller signal relationships based at least on the determined frequency of instances of one or more particular received game controller signals.

30. The system of claim 29, wherein each game controller signal is associated with a particular manipulation of a game controller.

31. The system of claim 29, wherein the interface application is operable to:

based at least on the determined frequency of instances of one or more particular received game controller signals, cause a message indicating a proposed modification of a particular controller signal relationship to be communicated;

receive a response to the message, the response indicating an acceptance of the proposed modification of the particular controller signal relationship; and based on the received response, cause the proposed modification of the particular controller signal relationship to be implemented.

32. The system of claim 29, wherein the interface application is operable to modify a particular controller signal relationship associated with the particular received game controller signal if the determined frequency of instances of a particular received game controller signal exceeds a predetermined threshold frequency.

33. The system of claim 29, wherein determining the frequency of instances of one or more particular received game controller signals comprises performing a statistical analysis of the received game controller signals.

34. The system of claim 29, wherein determining the frequency of instances of one or more particular received game controller signals comprises determining the frequency of instances of one or more particular received game controller signals associated with selecting the size of a trading order.

35. A system for managing trading, comprising:

a computer system having a processor; and a computer readable medium coupled to the computer system, the computer readable medium comprising a program operable, when executed by the processor, to:

store, by at least one processor, a plurality of controller signal relationships, each controller signal relationship associating one or more of a plurality of game controller signals with one of a plurality of trading system commands associated with the electronic trading of financial instruments via a trading platform, the plurality of controller signal relationships associating at least one trading system command with one or more controller signals comprising directional data associated with movement of a joystick configured for movement away from a center position in a plurality of directions spanning 360 degrees;

receive, by the at least one processor, one or more game controller signals generated by a game controller, the one or more game controller signals comprising a plurality of directional inputs of at least one joystick generated by movements by at least one joystick in at least one direction, said at least one joystick configured for movement away from a center position in a plurality of directions spanning 360 degrees;

store, by the at least one processor a log of the one or more received game controller signals generated by the game controller, the log comprising the plurality of directional inputs of the at least one joystick;

determine, based at least on the log of received game controller signals comprising the plurality of directional inputs, that one or more particular received game controller signals are erroneous, in which the one or more particular erroneous game controller signals comprise at least one of the plurality of directional inputs; and based on the act of determining that at least one of the plurality of directional inputs are erroneous, modify, by the at least one processor, at least one of the plurality of controller signal relationships based at least on the one or more received game controller signals, in which the act of modifying at least one of the plurality of controller signal relationships comprises modifying the directional data associated with the at least one trading system command.

36. The system of claim 35, further comprising:
a memory operable to store:
   a first set of controller signal relationships, the first set associated with a first user and with a first type of game controller;
   a second set of controller signal relationships, the second set associated with the first user and with a second type of game controller; and
   a third set of controller signal relationships, the third set associated with a second user and with the first type of game controller;
an interface application communicatively coupled to the memory, wherein:
   at least one controller signal relationship associates one of a plurality of game controller signals with one of a plurality of trading system commands associated with the electronic trading of financial instruments; and
the interface application is operable to:
   identify a particular user associated with a particular game controller;
   identify a particular controller type associated with the particular game controller;
   determine at least one of the stored sets of controller signal relationships based at least in part on the identified user and the identified controller type;
   receive a particular game controller signal from the particular game controller;
   determine the trading system command associated with the particular game controller signal based at least in part on the at least one determined set of controller signal relationships; and
   communicate the determined trading system command such that the trading system command is executed.

37. The system of claim 23, in which the predetermined numerical threshold is ten.

* * * * *